(No Model.) 2 Sheets—Sheet 1.

M. HUTIN & M. LEBLANC.
CONVERTER OF FREQUENCY FOR ALTERNATING ELECTRIC CURRENTS.

No. 557,094. Patented Mar. 24, 1896.

Witnesses:
J. M. Fowler Jr.
F. T. Chapman

Inventors
Maurice Hutin
Maurice Leblanc
By Joseph Lyon
Attorney

UNITED STATES PATENT OFFICE.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ÉLECTRICITÉ, OF SAME PLACE.

CONVERTER OF FREQUENCY FOR ALTERNATING ELECTRIC CURRENTS.

SPECIFICATION forming part of Letters Patent No. 557,094, dated March 24, 1896.

Original application filed March 13, 1894, Serial No. 503,524. Divided and this application filed March 3, 1896. Serial No. 581,683. (No model.) Patented in France October 8, 1891, No. 216,620; in Germany October 30, 1891, No. 72,461, and in Austria-Hungary October 23, 1892, No. 20,131 and No. 42,071.

*To all whom it may concern:*

Be it known that we, MAURICE HUTIN and MAURICE LEBLANC, citizens of the Republic of France, and residents of Paris, in the Department of the Seine, in the Republic of France, have invented certain new and useful Improvements in Converters of Frequency of Alternating Electric Currents, (the same having been patented in France, No. 216,620, dated October 8, 1891; in Austria-Hungary, No. 20,131 and No. 42,071, dated October 23, 1892, and in Germany, No. 72,461, dated October 30, 1891,) of which the following is a specification.

This invention has reference to the conversion of alternating electric currents of any frequency and tension, coming from any source, into alternating currents of any other frequency and tension.

To the apparatus which is required for the practice of this invention we have given the name "converter of frequency and tension," but it may be used for the conversion of frequency alone, in which case the apparatus becomes a "converter of frequency" pure and simple. The conversion of frequency of alternating currents we have utilized in connection with a system of generation of alternating currents of very high frequency, set forth in our pending application, Serial No. 503,524, filed March 13, 1894, of which this is a division; but it may be utilized for many other purposes and independently of any particular system of generation of currents. The invention will, therefore, come into use wherever there is a line of distribution charged with alternating currents of a given frequency, and where the translating devices to be operated require for successful and efficient operation currents of another frequency.

Figure 1:
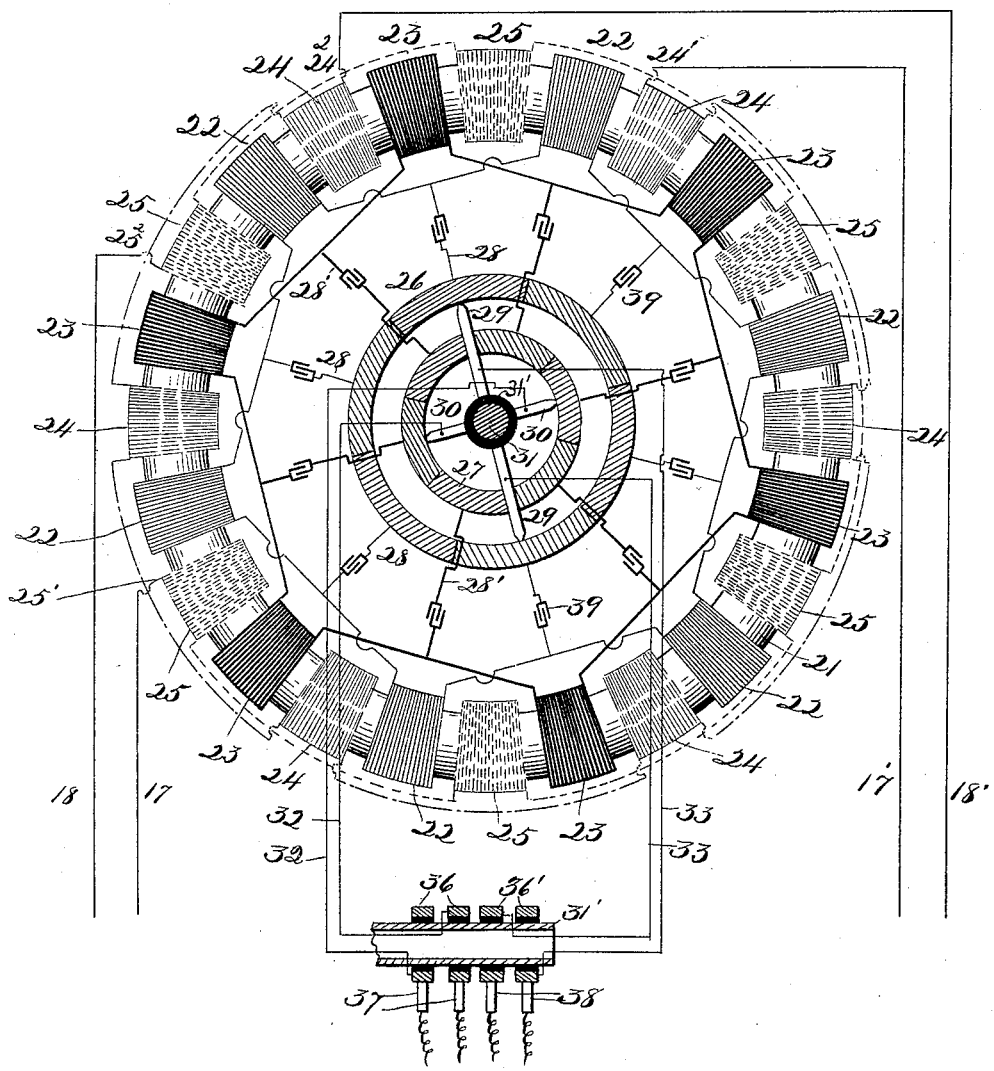
Figure 2:
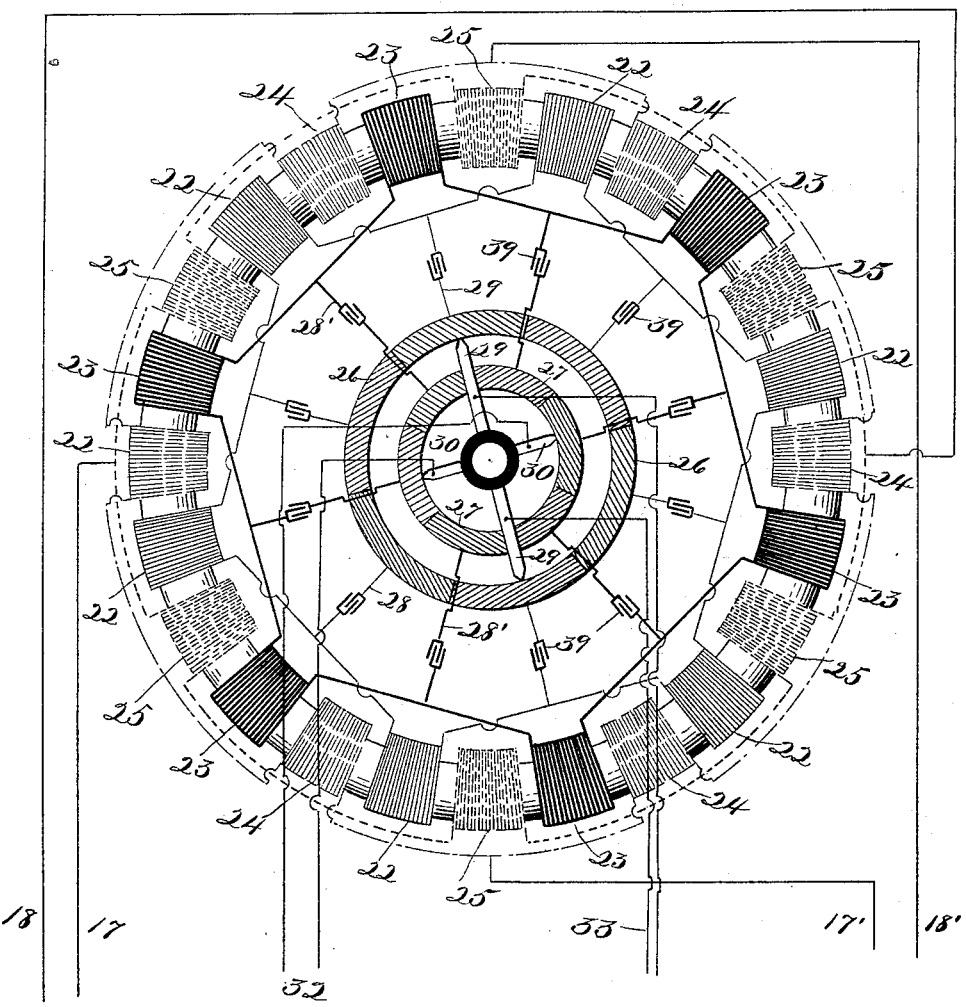

In the accompanying drawings, which form a part of this specification, we have illustrated in Figure 1 one form of our converter of frequency, mainly in diagram, and in Fig. 2 a modified construction of the same.

Referring now more particularly to Fig. 1, the apparatus is constructed as follows: There is a ring-core 21, which ordinarily will be made of laminated soft iron, but which, for currents of rather high frequency, should be of insulating material to prevent loss of energy by hysteresis. Upon the ring-core are placed four series of coils, which in the drawing are distinguished from each other by different shadings and by different thicknesses or characters of the lines; but it must be understood that this mode of distinguishing the sets of coils from each other is not intended to convey an idea of the relative thicknesses of the wires.

The four sets of coils are marked 22 23 24 25, respectively. The set of coils 22 is wound upon the core and connected like the coils of a Gramme ring—that is to say, the successive coils of this set are connected in a closed series. The set of coils 23 is arranged in precisely the same manner. The set of coils 24 has also its successive coils connected in series, but the series is not closed upon itself but terminates at $24'\ 24^2$, and these terminals are connected with the conductors $17'\ 18'$, respectively. The fourth set of coils 25 is wound in the same manner as the set of coils 24, and its terminals $25'\ 25^2$ are connected with the conductors 17 18.

The conductors 17 18 and $17'\ 18'$ must be understood to be extended so as to constitute a two-phase system of distribution, connected either with a generator or generators of two-phase alternating currents, or with translating devices adapted to be operated by two-phase currents, or with both.

The two-phase alternating currents, either fed into or obtained from the apparatus by the conductors 17 18 $17'\ 18'$, may be derived from a monophase alternating current by means of condensers or may be combined into a monophase current by condensers in the manner set forth in our Letters Patent No. 536,032, granted to us on March 19, 1895, or by other suitable means, as will be readily understood by those skilled in the art.

Supposing now that the conductors 17 18 and $17'\ 18'$ convey currents from an external source or sources to the converter, and that the currents in conductors 17 18 are dephased, with reference to the currents in conductors 17' 18', by one-quarter of a wave length, then it will be seen that the passage of these currents through the converter-coils 25 and 24, respectively, will produce a rotary magnetic field of force, the frequency of rotation of which will be equal to the frequency of the alternating current. This rotating field of force will therefore generate in the system of coils 22 and 23 alternating currents of the same frequency; but owing to the displacement of these coils, with reference to each other upon the core, the currents in one system will be dephased, with reference to the currents in the other system, by one-quarter of a wave length.

The two closed series of coils 22 23 are connected each with a commutator 26 27, respectively, precisely in the manner of a Gramme ring, by the radial conductors 28 28' and, upon these commutators bear the rotatable pairs of brushes 29 29 and 30 30, respectively, all fixed upon a common shaft 31 and insulated from the same and from each other. In the drawings the commutators are shown, for the sake of simplicity of illustration, as two concentric segmental rings, one larger than the other; but in practice a different arrangement may be and is ordinarily used.

The brushes 30 30 are connected by conductors 32 with collector-rings 36, mounted upon but insulated from an extended hollow portion 31' of the shaft 31, and the brushes 29 29 are in like manner connected with collector-rings 36', upon the same extended hollow portion of the shaft, by conductors 33. Upon these collector-rings bear the brushes 37 38, respectively, by which the currents derived from the converter may be conveyed to translating devices or by which currents coming from an external source may be conveyed to the converter. The pairs of brushes 29 30 are disposed at right angles to each other, and the coils of the two sets 22 23 are alternated by the coils of the two sets 24 25, as shown, and there is an even number of coils in each set.

The operation of this converter of frequency will now be readily understood.

Supposing that currents having the frequency $\frac{1}{T}$ are generated in the system of distribution which connects with the conductors 17 18 and 17' 18' and it is desired to obtain from the converter currents of a different frequency. So long as the brushes 29 29 and 30 30 are at rest the currents derived from the brushes 37 and 38 will have the same frequency $\frac{1}{T}$; but if the system of brushes 29 30 is rotated with the frequency X in the same direction as the rotation of the magnetic field, then it is clear that the currents derived from the brushes 37 38 will have the frequency $\frac{1}{T} - X$. From this it follows that if the brushes are rotated in the same direction in which the field of force rotates and with the same speed the currents derived from the brushes 37 38 will be unidirectional currents—that is to say, $\frac{1}{T} - X$ will be equal to zero. Consequently all frequencies between $\frac{1}{T}$ and zero may be obtained. If the brushes were rotated in the same direction but with a greater frequency than that of the field, or, which is the same thing, than the frequency of the original currents, then the frequency of currents obtained from the brushes 37 38 would be $X - \frac{1}{T}$. If under the same conditions the brushes are rotated with the frequency X but in the opposite direction to the rotation of the field, then the currents derived from the brushes 37 38 will have the frequency $\frac{1}{T} + X$. It will thus be seen that if the original currents enter the converter by the conductors 17 18 17' 18' with any given frequency there may be obtained from the brushes 37 38 alternating currents of the same or of any other frequency, including the frequency zero, and it will be seen that this is accomplished by changing the points of the connections of the lines 32 33 with the commutator apparatus.

The reversal of the use of the apparatus leads to the same result. Supposing that the original currents enter the apparatus by the brushes 37 38 with the frequency $\frac{1}{T}$, and currents of another frequency are to be obtained in the line conductors 17 18 17' 18'. It will be clear that so long as the brushes 29 29 30 30 are stationary the currents in the lines 17 18 and 17' 18' will have the frequency as the original currents; but if these brushes are rotated in the same direction as the rotation of the field with the frequency X, the currents obtained in the lines 17 18 17' 18' will have the frequency $\frac{1}{T} + X$; while if this system of brushes is rotated in opposition to the rotation of the field, the frequency of currents in lines 17 18 17' 18' will be $\frac{1}{T} - X$, so that from currents of a given frequency, entering the converter by the brushes 37 38, there may be obtained currents of any other frequency, including the frequency zero—that is to say, unidirectional currents—and here again this result is accomplished by changing the points of line connection with the commutator apparatus.

The converter of frequency may be constructed with coils having all the same number of turns, in which case the outgoing currents will have the same tension as the incoming currents, or the coils may be so wound as to convert the tension of the currents at the same time as the frequency is converted.

In the operation of this converter of frequency, at the moments when either of the brushes 29 30 bridge two consecutive segments of a commutator one of the coils of the series 22 or 23 would be short-circuited and a considerable amount of energy needlessly consumed thereby, if the circuits of the coils were continuous. To obviate this difficulty, the metallic continuity of these circuits must be interrupted by means which permit the passage of alternating currents—namely, by condensers of suitable capacity—and we insert such condensers at the proper places—as, for instance, in the connections 28 28', between the coils and commutators. These condensers are marked with the numeral 39.

If only a single pair of brushes 37 or 38 is used to convey a monophase alternating current to the converter, the result will be a monophase current of changed period, which may be derived either from the conductors 17 18 or 17' 18'. For such work the converter will have only a single set of coils 22 or 23, a single set of coils 24 or 25, and a single pair of brushes 29 or 30. Conversely, this converter of frequency is also adapted for the simultaneous conversion of any number of alternating currents which are dephased with reference to each other. The number of sets of primary and secondary circuits will then be adapted to the number of dephased currents, and the commutator will have as many rings with corresponding sets of brushes as there are circuits of each kind.

We are not confined to the exact details of construction herein described, since the same can be obviously varied in a variety of ways that will readily suggest themselves to those skilled in the art. More particularly are we not confined to the particular winding and connections of the converter described with reference to Fig. 1, since it is quite practicable to close each series of the coils upon itself, as is shown in Fig. 2. In this case the coils 22 23 are arranged and connected with commutators the same as shown in Fig. 1, but the sets of coils 24 25 are each closed upon themselves and are each tapped at diametrically-opposite sides. Since all parts corresponding to those in Fig. 1 are here marked with the same numerals, no further description is deemed necessary.

Having now fully described our invention, we claim and desire to secure by Letters Patent—

1. The method of transforming an alternating electric current of one periodicity into an alternating current of another periodicity, which consists in successively and continuously changing the points of line connection in either direction around a commutator apparatus, substantially as described.

2. The method of converting alternating currents of a given frequency into alternating currents of different frequency, by producing, by the currents to be converted, a magnetic field or fields rotating with the frequency of said currents, accelerating or retarding the rotation of said field or fields to the desired frequency, and generating currents by the inductive influence of the accelerated or retarded field, or fields, substantially as described.

3. The method of producing alternating electric currents of any desired frequency from currents of a given frequency by the intermediary of the primary and secondary circuits of a transformer, which consists in passing the currents of the given period through the primary circuits and shifting the points of connection of either of the circuits and the line, relatively to the polarity of the primary, substantially as described.

4. The method of changing the relative periods of primary and secondary alternating currents, which consists in producing therewith a moving line or lines of polarity in a transformer, and producing in effect a variation in the speed of rotation of polarity by shifting the points of electrical connection, substantially as described.

5. A converter of frequency of alternating electric currents, consisting of an induced and an inducing member, a commutator apparatus connected with one member and brushes connected with a source of alternating currents, bearing upon the commutator and adapted to be rotated about the same in either direction, substantially as described.

6. As a means of converting alternating electric currents of one period into currents of another period, the combination of a transformer provided with primary circuits charged with alternating currents generating a rotating magnetic field or fields, and a secondary circuit or circuits to co-operate therewith, with a commutator apparatus connected at suitable intervals with either of these circuits, brushes bearing upon the commutator and means for rotating the brushes in either direction, substantially as described.

7. A converter of frequency of alternating electric currents consisting of the combination of two or more primary circuits adapted to be charged with dephased alternating currents to produce a rotating line or lines of polarity and one or more secondary circuits; a commutator-ring for each primary circuit and brushes bearing upon the commutator-rings and adapted to be rotated about the same, in either direction, substantially as described.

In testimony whereof we have signed our names to this specification in the presence of two subscribing witnesses.

MAURICE HUTIN.
MAURICE LEBLANC.

Witnesses:
CLYDE SHROPSHIRE,
PAUL BOUR.